(12) United States Patent
Oshima

(10) Patent No.: US 11,186,938 B2
(45) Date of Patent: Nov. 30, 2021

(54) ACTUATOR, CLUTCH DEVICE, AND WASHING MACHINE

(71) Applicant: NIDEC SANKYO CORPORATION, Nagano (JP)

(72) Inventor: Yuta Oshima, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 64 days.

(21) Appl. No.: 16/679,589

(22) Filed: Nov. 11, 2019

(65) Prior Publication Data

US 2020/0157727 A1  May 21, 2020

(30) Foreign Application Priority Data

Nov. 20, 2018  (JP) .............................. JP2018-216933

(51) Int. Cl.
*D06F 37/40* (2006.01)
*D06F 21/06* (2006.01)
*F16D 23/12* (2006.01)
*F16D 11/14* (2006.01)

(52) U.S. Cl.
CPC .............. *D06F 37/40* (2013.01); *D06F 21/06* (2013.01); *F16D 11/14* (2013.01); *F16D 23/12* (2013.01)

(58) Field of Classification Search
CPC .......... D06F 37/40; D06F 21/06; D06F 23/04; D06F 17/08; F16D 23/12; F16D 11/14; F16D 2023/123; F16D 28/00
See application file for complete search history.

(56) References Cited

U.S. PATENT DOCUMENTS

| 9,114,798 B1* | 8/2015 | Fox ...................... B62D 11/003 |
| 2017/0145611 A1* | 5/2017 | Yazawa ................... F16D 11/10 |

FOREIGN PATENT DOCUMENTS

| JP | S58132479 A | 8/1983 |
| JP | 2014064343 A | 4/2014 |

* cited by examiner

*Primary Examiner* — Michael E Barr
*Assistant Examiner* — Pallavi Chitta
(74) *Attorney, Agent, or Firm* — Cantor Colburn LLP

(57) ABSTRACT

To provide a structure in which a fixing member having the same shaft length can be employed in both two cases, wherein an actuator of a first case is fixed together with an auxiliary unit to a supporting member, and the actuator of a second case is fixed solely to the supporting member; a clutch device; and a washing machine.

8 Claims, 11 Drawing Sheets

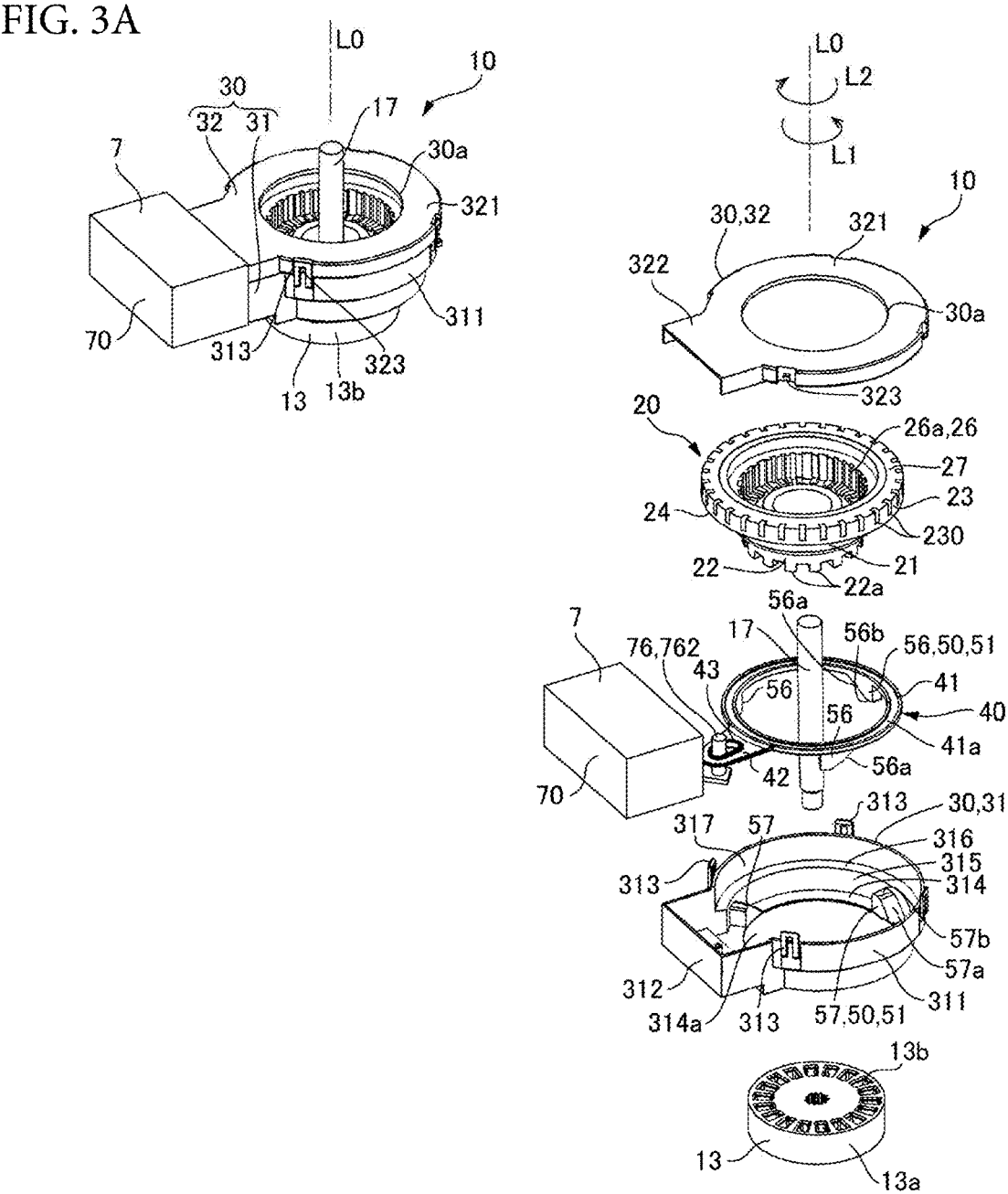

FIG. 4A
FIG. 4B
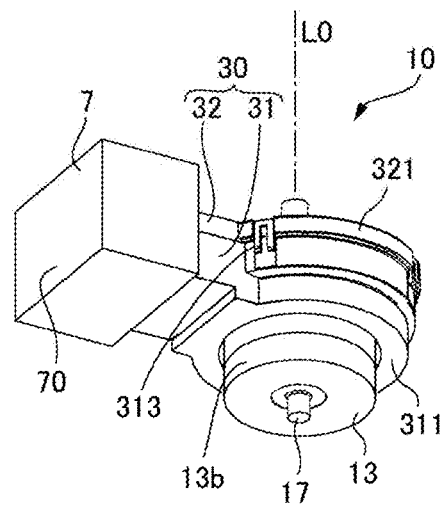
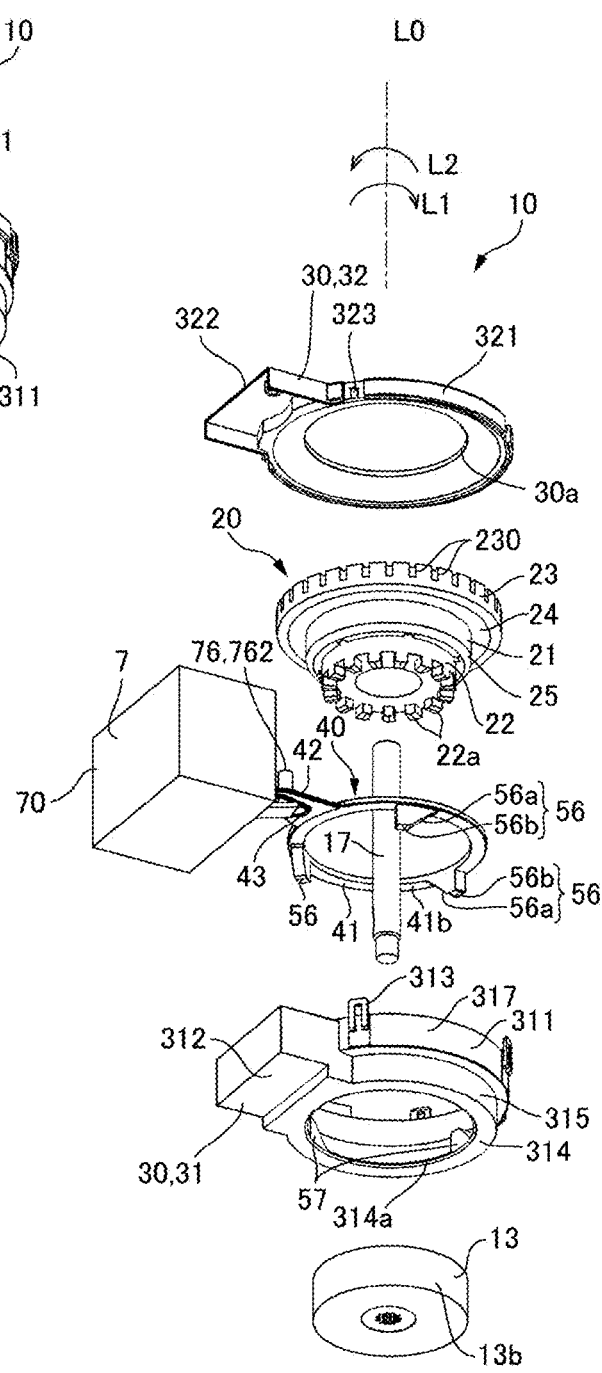

ACTUATOR, CLUTCH DEVICE, AND WASHING MACHINE

CROSS REFERENCE TO RELATED APPLICATIONS

The present invention claims priority under 35 U.S.C. § 119 to Japanese Patent Application No. 2018-216933 filed on Nov. 20, 2018, the entire contents of which are incorporated herein by reference.

FIELD OF THE INVENTION

At least an embodiment of the present invention relates to an actuator, a clutch device, and a washing machine.

BACKGROUND

When a plurality of units are mounted in a machine, sometimes there is employed a structure in which cases of units, being located side by side, are connected to each other by use of a fixing member such as a screw and the like, wherein the cases overlap with each other (refer to Patent Document 1 and Patent Document 2).

PRIOR ART DOCUMENTS

Patent Documents

Patent Document 1: Japanese Unexamined Patent Application Publication No. 58-132479*
Patent Document 2: Japanese Unexamined Patent Application Publication No. 2014-64343

SUMMARY

In a fixing structure described in Patent Document 1 and Patent Document 2; if the units are fixed to a supporting member, such as a frame of a machine main body and the like, by use of a fixing member to fix the cases of the units to each other, a productivity and the like can be improved. On the other hand, when two cases are compared wherein a first case includes only one unit being mounted on the supporting member, and a second case includes two units being mounted on the supporting member; it is needed to use fixing members having each different screw shaft length that prevents standardization with respect to the fixing members.

With the issue described above being taken into consideration, it is an objective of at least an embodiment of the present invention to provide a structure in which a fixing member having the same shaft length can be employed in both two cases, wherein an actuator of a first case is fixed together with an auxiliary unit to a supporting member, and the actuator of a second case is fixed solely to the supporting member; a clutch device; and a washing machine.

In order to solve the issue described above, an actuator according to at least an embodiment of the present invention comprises a first case component including; a first connection part provided with a first pass-through part, and a locating convex part protruding from the first connection part toward one side in a direction of an axial line of the first pass-through part, a second case component provided with; a second connection part that is located at a position so as to contact the locating convex part from the one side in the direction of the axial line, and so as to be distant in relation to the first connection part at the one side in the direction of the axial line, and a second pass-through part that overlaps with the first pass-through part at the second connection part in the direction of the axial line, and a drive mechanism placed between the first case component and the second case component; wherein, the first connection part and the second connection part are fixed to a supporting member by use of a fixing member including a shaft part that passes through the first pass-through part and the second pass-through part.

According to at least an embodiment of the present invention; adopted may be a mode, in which the actuator includes an auxiliary unit provided with a third connection part sandwiched between the first connection part and the second connection part, and a third pass-through part that overlaps with the first pass-through part at the third connection part in the direction of the axial line; and the first connection part, the third connection part, and the second connection part are fixed to the supporting member by use of the fixing member, in a situation where the shaft part passes through the first pass-through part, the third pass-through part, and the second pass-through part.

According to at least an embodiment of the present invention; by use of the locating convex part provided at the first connection part of the first case component, the second connection part of the second case component can be located at a position that is distant in relation to the first connection part, at one side in the direction of the axial line. In the meantime, the first connection part and the second connection part are fixed to the supporting member by use of the fixing member provided with the shaft part that passes through the first pass-through part of the first connection part and the second pass-through part of the second connection part. Under this situation, the first connection part and the second connection part are distant from each other in the direction of the axial line. Therefore, under a situation where the third connection part of the auxiliary unit is sandwiched between the first connection part and the second connection part, a fixing member having the same shaft length can be employed, even in the case where the shaft part of the fixing member passes through the first pass-through part of the first connection part, the third pass-through part of the third connection part, and the second pass-through part of the second connection part, in such a way as to fix the first connection part, the third connection part and the second connection part to the supporting member. Accordingly, in both two cases, where the actuator of a first case is fixed together with the auxiliary unit to the supporting member, and the actuator of a second case is fixed solely to the supporting member, the fixing member having the same shaft length can be employed so that standardization with respect to the fixing member can be materialized.

According to at least an embodiment of the present invention; adopted may be a mode, in which the auxiliary unit is a sensor unit including a cover, and a sensor supported by the cover, and the cover is provided with the third connection part.

According to at least an embodiment of the present invention; adopted may be a mode, in which the locating convex part is a cylindrical part through which the first pass-through part passes in the direction of the axial line; and the cylindrical part is placed inside the third pass-through part.

According to at least an embodiment of the present invention; adopted may be a mode, in which a clearance is prepared in the direction of the axial line, at least in one of a space between the first connection part and the third connection part, or a space between the second connection part and the third connection part.

According to at least an embodiment of the present invention; adopted may be a mode, in which the drive mechanism includes a motor, a turn transmission mechanism, and an output element to which a turn of the motor is transmitted by the intermediary of the turn transmission mechanism.

For a clutch device including the actuator according to the present invention, there may be adopted a mode, in which a clutch member, to be actuated by the actuator in order to allow/block mechanical engagement, is supported by the supporting member.

For a washing machine including the clutch device according to at least an embodiment of the present invention, there may be adopted a mode, in which the washing machine has a washing machine motor, a washing tub, a pulsator placed in the washing tub, and a drive force transmission mechanism for transmitting a turning drive force of the washing machine motor to the washing tub and the pulsator; wherein, the drive force transmission mechanism has the clutch device on the way of a drive force transmission route from the washing machine motor to the washing tub.

According to at least an embodiment of the present invention; by use of the locating convex part provided at the first connection part of the first case component, the second connection part of the second case component can be located at a position that is distant in relation to the first connection part, at one side in the direction of the axial line. In the meantime, the first connection part and the second connection part are fixed to the supporting member by use of the fixing member provided with the shaft part that passes through the first pass-through part of the first connection part and the second pass-through part of the second connection part. Under this situation, the first connection part and the second connection part are distant from each other in the direction of the axial line. Therefore, under a situation where the third connection part of the auxiliary unit is sandwiched between the first connection part and the second connection part, a fixing member having the same shaft length can be employed, even in the case where the shaft part of the fixing member passes through the first pass-through part of the first connection part, the third pass-through part of the third connection part, and the second pass-through part of the second connection part, in such a way as to fix the first connection part, the third connection part and the second connection part to the supporting member. Accordingly, in both two cases, where the actuator of a first case is fixed together with the auxiliary unit to the supporting member, and the actuator of a second case is fixed solely to the supporting member, the fixing member having the same shaft length can be employed so that standardization with respect to the fixing member can be materialized.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3A-FIG. 3B includes oblique perspective illustrations of a clutch device to which the present invention is applied, the clutch device being viewed from an oblique higher position.

FIG. 4A-FIG. 4B includes oblique perspective illustrations of the clutch device to which the present invention is applied, the clutch device being viewed from an oblique lower position.

DETAILED DESCRIPTION

Figure 7:
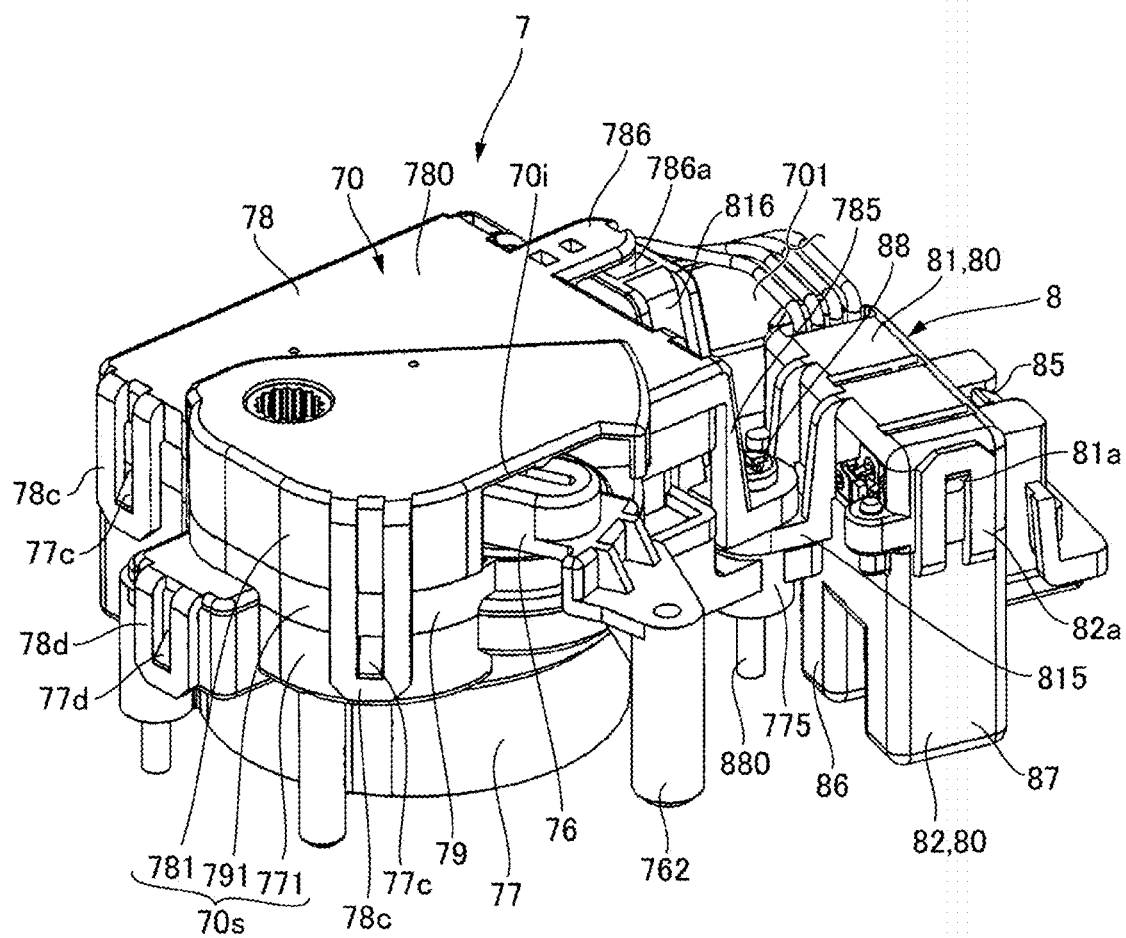
FIG. 7 is an oblique perspective illustration of the actuator, shown in FIG. 2A-FIG. 2B and others, viewed from a side opposite to a protruding direction of a drive pin.

Preferred embodiments for materializing the present invention are explained below, with reference to the drawings. Incidentally, in FIG. 2A-FIG. 2B, FIG. 3A-FIG. 3B and FIG. 4A-FIG. 4B, an actuator 7 is schematically illustrated as a cuboid, and meanwhile an actual external appearance of the actuator 7 is illustrated in FIG. 7 and others.

(General Configuration)

Figure 1:
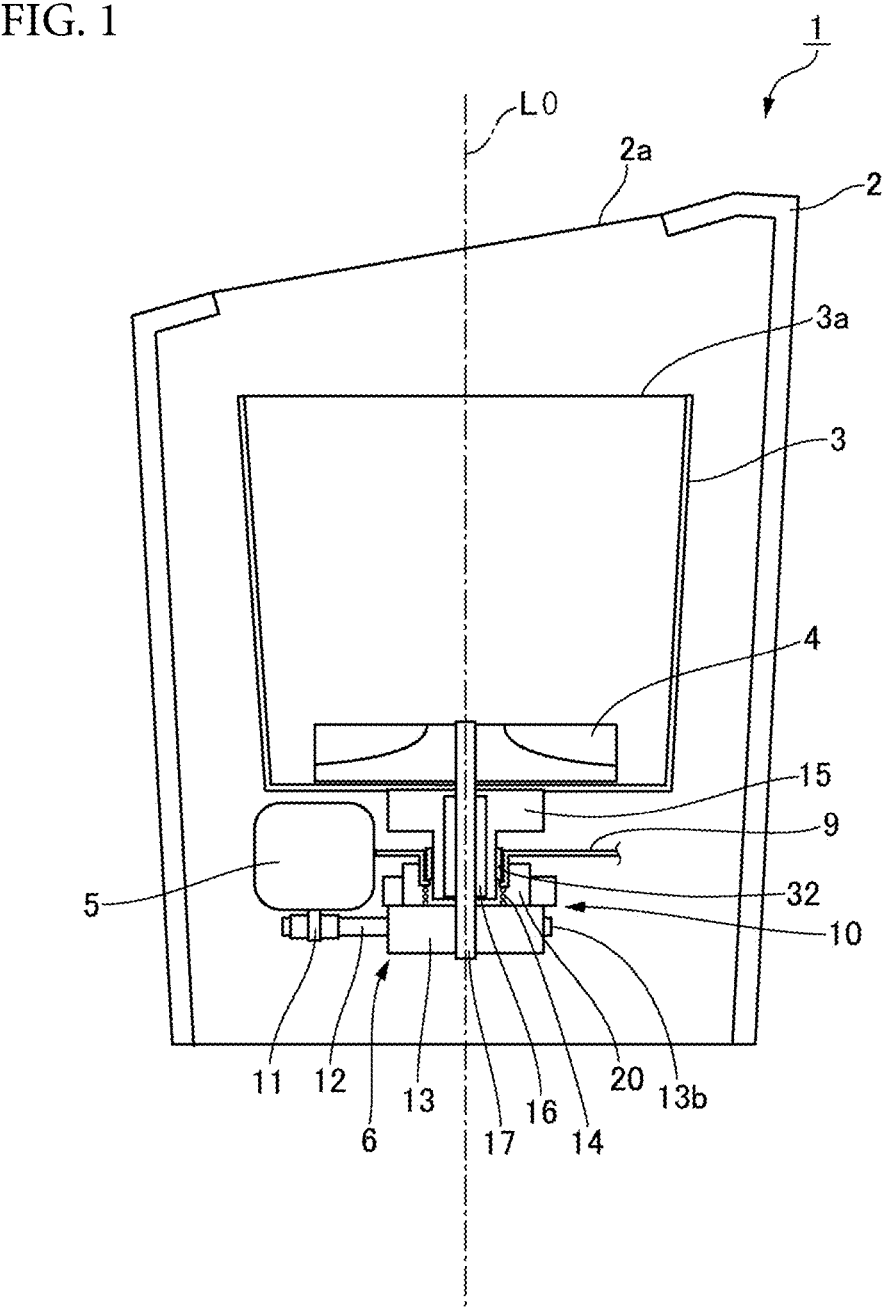
FIG. 1 is a vertical cross-sectional view showing a diagrammatic structure of a washing machine to which the present invention is applied.

FIG. 1 is a vertical cross-sectional view showing a diagrammatic structure of a washing machine 1 to which the present invention is applied. In the washing machine 1 shown in FIG. 1, a main body frame 2 being cylindrical is provided with an opening part 2a at a top side of the main body frame 2 for taking laundry in and out, and meanwhile a bottom side of the main body frame 2 is open. Inside the main body frame 2, there is stored a washing tub 3 being cylindrical and having a bottom part, with its opening part 3a oriented upward. The washing tub 3 is suspended by the main body frame 2, by the intermediary of a buffer material, not illustrated, so as to be rotatable around an axial line 'LO.' At a bottom part inside the washing tub 3, there is placed a pulsator 4.

Under the washing tub 3, there is placed a washing machine motor 5. A turning drive force of the washing machine motor 5 is transmitted to the washing tub 3 and the pulsator 4 by the intermediary of a drive force transmission mechanism 6. The drive force transmission mechanism 6 is provided with a clutch device 10 in order to allow/block transmission of the turning drive force of the washing machine motor 5 to the washing tub 3, on the way of a drive force transmission route from the washing machine motor 5 to the washing tub 3. Under the washing tub 3, there is placed a sensor for detecting a turn of the washing tub 3. Incidentally, a configuration of the sensor is described later. The clutch device 10 includes a supporting member 19, made of a plate material; and then the clutch device 10 is supported by the main body frame 2, by the intermediary of the supporting member 19. As described later with reference to FIG. 5 and FIG. 6, the supporting member 19 is shaped like a cup; and incidentally, only a bottom plate part of the supporting member 19 is shown in FIG. 1, and FIG. 2A-FIG. 2B to be described later.

When the washing machine 1 works in a situation where laundry has been placed in the washing tub 3, wash water is supplied into the washing tub 3 through a water supply pipe (not illustrated). Subsequently, if the washing machine motor 5 is driven, the pulsator 4 turns to carry out washing operation for the laundry inside the washing tub 3. During the washing operation, the clutch device 10 is in a blocking situation for blocking the transmission of the turning drive force of the washing machine motor 5 to the washing tub 3. Therefore, the washing tub 3 is in stop condition.

After the washing operation finishes and the wash water is drained out of the washing tub 3, spin-drying operation is carried out. During the spin-drying operation; under a connection-allowed situation where the turning drive force of the washing machine motor 5 is transmitted to the washing tub 3 by use of the clutch device 10, the washing machine motor 5 is driven. As a result, the pulsator 4 and the washing tub 3 rotate together in such a way that the laundry inside the washing tub 3 is spin-dried.

Figure 2A:
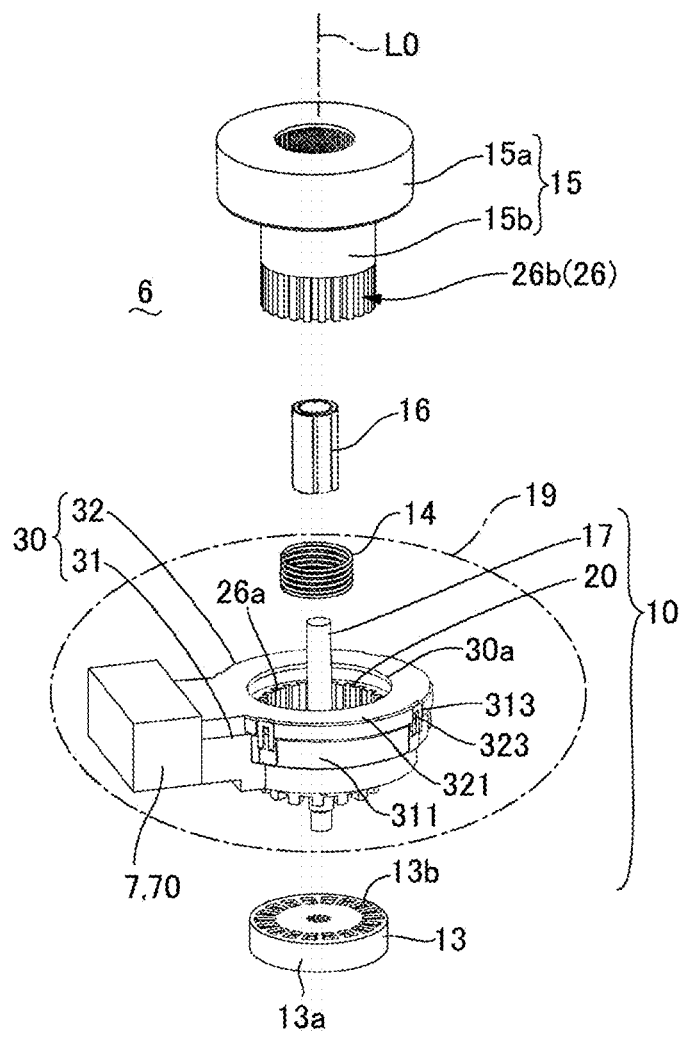
FIG. 2A-FIG. 2B includes explanatory diagrams of a drive force transmission mechanism and others shown in FIG. 1.
Figure 2B:
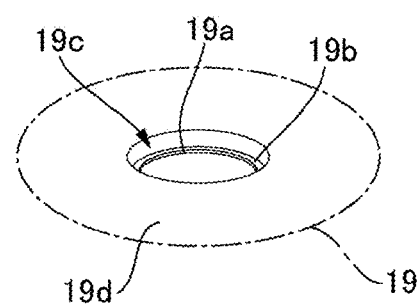

(Drive force transmission mechanism) FIG. 2A-FIG. 2B includes explanatory diagrams of the drive force transmission mechanism 6 and others shown in FIG. 1; wherein FIG. 2A-FIG. 2B are an exploded perspective diagram of a main part of the drive force transmission mechanism 6, and an explanatory diagram of the supporting member 19, respectively. As shown in FIG. 1 and FIG. 2A-FIG. 2B, the drive force transmission mechanism 6 includes a first turning member 13 to which the turning drive force of an output shaft 11 of the washing machine motor 5 is transmitted by the intermediary of an endless belt 12; a turning shaft 17 that is assembled coaxially with the first turning member 13; a connecting member 15 that is connected coaxially to a bottom end part of the washing tub 3; and a second turning member 20 connected to the connecting member 15. The first turning member 13 is shaped so as to be disk-like, and placed under the washing tub 3 so as to be coaxial with the washing tub 3. A circular external surface of the first turning member 13 is a placement surface 13a on which the endless belt 12 is placed.

The first turning member 13 is provided with a tooth part 13b arranged in a circumferential direction, at a top end surface of the first turning member 13. A lower end part of the turning shaft 17 is connected to the first turning member 13; and on the other hand, passing through a bottom part of the washing tub 3, an upper end part of the turning shaft 17 is connected to the pulsator 4. Accordingly, the turning drive force of the washing machine motor 5 is transmitted to the pulsator 4, by the intermediary of the endless belt 12, the first turning member 13, and the turning shaft 17. In other words, between the washing machine motor 5 and the pulsator 4, there is configured a drive force transmission route including the endless belt 12, the first turning member 13, and the turning shaft 17.

The turning shaft 17 is placed inside a tubular member 16. The tubular member 16 and the turning shaft 17 are not connected to each other, so that the tubular member 16 is in a situation of being relatively rotatable in relation to the turning shaft 17. An outer circumferential side of the tubular member 16 is connected to the connecting member 15 so that the tubular member 16 and the connecting member 15 integrally turn. The connecting member 15 includes a large-diameter flange part 15a, to be connected to the washing tub 3 and a small-diameter cylindrical part 15b, having a diameter smaller than the large-diameter flange part 15a, the large-diameter flange part 15a and the small-diameter cylindrical part 15b being located in this order from an upper side to a lower side in a direction of the axial line 'LO.' The tubular member 16 is inserted inside the small-diameter cylindrical part 15b, and the tubular member 16 is connected to the small-diameter cylindrical part 15b in such a way as to turn together with the connecting member 15. At an outer circumferential side of a lower side part of the small-diameter cylindrical part 15b, there is coaxially connected the second turning member 20.

While a plurality of vertical grooves 26a are shaped on an inner circumferential surface of the second turning member 20, a plurality of linear protrusions 26b, which make up a serrated part 26 together with the vertical grooves 26a, are shaped on an outer circumferential surface of the small-diameter cylindrical part 15b. Therefore, the second turning member 20 is connected to the connecting member 15, by use of the serrated part 26, in such a way that the second turning member 20 is relatively-movable in relation to the connecting member 15 in the direction of the axial line 'LO', and integrally rotatable together with the connecting member 15.

(Configuration of the Clutch Device 10)

FIG. 3A-FIG. 3B includes oblique perspective illustrations of the clutch device 10 to which the present invention is applied, the clutch device being viewed from an oblique higher position; and FIG. 3A and FIG. 3B are an overall oblique perspective illustration and an exploded perspective illustration of the clutch device 10, respectively. FIG. 4A-FIG. 4B includes oblique perspective illustrations of the clutch device 10 to which the present invention is applied, the clutch device being viewed from an oblique lower position; and FIG. 4A and FIG. 4B are an overall oblique perspective illustration and an exploded perspective illustration of the clutch device 10, respectively.

As shown in FIG. 3A-FIG. 3B and FIG. 4A-FIG. 4B, the clutch device 10 includes the second turning member 20 that can engage with the first turning member 13; a clutch member 40 that displaces the second turning member 20; and the actuator 7 that actuates the clutch member 40 in a reciprocating manner, between a connecting position for mechanically connecting the second turning member 20 and the first turning member 13, and a disconnecting position for releasing the mechanical connection of the second turning member 20 and the first turning member 13. In the clutch device 10, a compression coil spring 14 biases the clutch member 40 downward, by the intermediary of the second turning member 20. The clutch member 40 includes a ring part 41, and an engagement plate part 42 that protrudes outward in a radial direction from a certain position in a circumferential direction of the ring part 41; and then the actuator 7 oscillates the clutch member 40 around the axial line 'LO' that passes through a center of the ring part 41, in a reciprocating manner.

The clutch device 10 has a case body 30 storing the clutch member 40 and others; and the case body 30 includes a lower case 31 that covers the clutch member 40 and others from a lower side, and an upper case 32 that covers the clutch member 40 and others from an upper side.

The lower case 31 includes a first case part 311, being cylindrical, and a second cover part 312, which has a cornered-barrel shape and protrudes outward in a radial direction from the first case part 311. The upper case 32 includes a second case part 321, which is shaped to be annular and so as to overlap with the first case part 311 of the lower case 31, and a second cover part 322, which has a cornered-barrel shape and protrudes outward in a radial direction from the second case part 321 so as to overlap with the second cover part 312 of the lower case 31. The lower case 31 and the upper case 32 are so placed as to be stacked by way of the supporting member 19, and connected to each other, in such a way that a convex engagement part 313, protruding upward from the lower case 31, engages with an engagement protrusion 323, being shaped on a side surface of the upper case 32. In this situation, between the first case part 311 and the second case part 321; there are placed the second turning member 20 and the ring part 41 of the clutch member 40, so as to be rotatable around the axial line 'LO.'

The first case part 311 of the lower case 31 includes a bottom plate part 314, being annular; a first torso part 315, being cylindrical and protruding upward from an outer circumferential rim of the bottom plate part 314; and a second torso part 317, being cylindrical, which leads to an upper side of the first torso part 315. The second torso part 317 has a diameter larger than the first torso part 315 has. Therefore, on an inner circumferential surface of the first case part 311, there is shaped a step part 316, being annular and facing upward, between the first torso part 315 and the second torso part 317.

(Configuration of the Second Turning Member 20)

The second turning member 20 includes a first torso part 21, being cylindrical; a flange part 27, being annual, which has an enlarged diameter at an upper end part of the first torso part 21; a second torso part 22, being cylindrical, which protrudes downward from the first torso part 21; and a third torso part 23, protruding downward from an outer rim of the flange part 27. Meanwhile, in the third torso part 23, there is shaped a slit 230 that is detected by use of a photo-interrupter (sensor 83) to be described later with reference to FIG. 9.

In an inner circumferential surface of the first torso part 21, there are shaped the plurality of vertical grooves 26a for making up the serrated part 26. Since the flange part 27 has a diameter larger than the first torso part 21 has, there is shaped a first step part 24, facing downward and being annular, between the flange part 27 and the first torso part 21 in an outer circumferential surface of the second turning member 20. The first step part 24 overlaps with the bottom plate part 314, being annular, of the lower case 31 from an upper side, by way of the ring part 41 of the clutch member 40. Moreover, since the second torso part 22 has a diameter smaller than the first torso part 21 has, there is shaped a second step part 25, facing downward and being annular, between the second torso part 22 and the first torso part 21 in the outer circumferential surface of the second turning member 20.

A lower end part of the second torso part 22 exposes itself downward (to a side where the first turning member 13 is located), through a bore 314a formed in the bottom plate part 314 of the lower case 31. Moreover, at a lower surface of the second torso part 22, there is shaped a tooth part 22a including a plurality of protrusions that extend in a radial direction at regular angular intervals; and then the tooth part 22a is able to engage with the tooth part 13b of the first turning member 13, at a time when the second turning member 20 moves downward.

Therefore, if once the second turning member 20 moves downward in the direction of the axial line 'LO' in such a way that the tooth part 22a engages with the tooth part 13b of the first turning member 13, the second turning member 20 turns together with the first turning member 13 in a coaxial situation. As a result, the turning drive force of the washing machine motor 5 shown in FIG. 1 is transmitted to the washing tub 3 by way of a drive force transmission route that includes the endless belt 12, the first turning member 13, the second turning member 20, and connecting member 15.

The clutch member 40 is placed between the lower case 31 and the second turning member 20. The clutch member 40 includes the ring part 41, and the engagement plate part 42 that protrudes outward in a radial direction from a certain position in a circumferential direction of the ring part 41; and in the engagement plate part 42, there is shaped an elongated hole 43 that extends in a radial direction. In the elongated hole 43, there is fit in a drive pin 762 that is shaped in an output element 76 of the actuator 7. The ring part 41 is the same in size, as the bottom plate part 314, being annular, of the lower case 31, and the first step part 24, being annular, of the second turning member 20; and meanwhile, the first step part 24 of the second turning member 20 overlaps with the bottom plate part 314 of the first case part 311 of the lower case 31, by way of the ring part 41 of the clutch member 40.

An upper surface 41a of the ring part 41 is a flat surface having no unevenness: and meanwhile, the first step part 24 of the second turning member 20 is also a flat surface having no unevenness. Therefore, the upper surface 41a of the ring part 41 and the first step part 24 of the second turning member 20 overlap with each other, while being in face-to-face contact.

Between a lower surface 41b of the ring part 41 and the bottom plate part 314 of the lower case 31, there is configured a guiding mechanism 50 that moves the clutch member 40 between the connecting position and the disconnecting position, to be described later, at a time when the clutch member 40 rotates around the axial line 'LO' that passes through the center of the ring part 41. In the present embodiment, when the clutch member 40 rotates around the axial line 'LO' that passes through the center of the ring part 41, the clutch member 40 is activated in the direction of the axial line 'LO', so as to move between the disconnecting position and the connecting position. Therefore, the guiding mechanism 50, configured between the lower surface 41b of the ring part 41 and the bottom plate part 314 of the lower case 31, is provided with a cam mechanism 51.

On the lower surface 41b of the ring part 41 of the clutch member 40, the cam mechanism 51 has a first convex part 56, protruding downward while its slope 56a is oriented toward one side L1 in a circumferential direction around the axial line 'LO'; and then the first convex part 56 has a lower end surface 56b, being flat, which is perpendicular to the axial line 'LO', at a position neighboring to the slope 56a toward the other side L2 in the circumferential direction around the axial line 'LO.' In the present embodiment, the first convex part 56 is shaped at three locations in number; and meanwhile on the lower surface 41b, a part having no first convex part 56 being shaped is a flat surface that is perpendicular to the axial line 'LO.'

In the meantime, on an upper surface of the bottom plate part 314 of the lower case 31, the cam mechanism 51 has a second convex part 57, protruding upward while its slope 57a (a first cam surface) is oriented toward the other side L2 in a circumferential direction around the axial line 'LO'; and then the second convex part 57 has an upper end surface 57b (a second cam surface), which is configured with a flat surface perpendicular to the axial line 'LO', at a position neighboring to the slope 57a toward the one side L1 in the circumferential direction around the axial line 'LO.' In the present embodiment, the second convex part 57 is shaped at three locations in number; and meanwhile on the upper surface of the bottom plate part 314, a surface part having no second convex part 57 being shaped is a flat surface (a third cam surface) that is perpendicular to the axial line 'LO.'

Accordingly, if the clutch member 40 is activated by the drive pin 762 of the actuator 7 in such a way as to rotate toward the one side L1 in the circumferential direction around the axial line 'LO', the first convex part 56 of the clutch member 40 lifts itself up along the slope 57a of the second convex part 57 shaped in the bottom plate part 314 of the lower case 31, in such a way that the first convex part 56 overlaps with the upper end surface 57b of the second convex part 57. As a result, the clutch member 40 lifts the second turning member 20 upward, against a biasing force of the compression coil spring 14 shown in FIG. 1. Therefore, an engagement between the tooth part 22a of the second turning member 20 and the tooth part 13b of the first turning member 13 is cancelled so as to release the mechanical connection of the second turning member 20 and the first turning member 13. Accordingly, the second turning member 20 does not turn even though the first turning member 13 turns, so that even if the pulsator 4 shown in FIG. 1 turns, the washing tub 3 does not turn.

Under this situation, if the clutch member 40 is activated by the drive pin 762 of the actuator 7 in such a way as to rotate toward the other side L2 in the circumferential direction around the axial line 'LO', the first convex part 56 descends along the slope 57a of the second convex part 57 shaped in the bottom plate part 314 of the lower case 31. As a result, the clutch member 40 and the second turning member 20 move downward owing to the biasing force of the compression coil spring 14. As a result of that, the tooth part 22a and the tooth part 13b of the first turning member 13 engage with each other in such a way that the second turning member 20 and the first turning member 13 are mechanically connected. Accordingly, if the first turning member 13 turns, the second turning member 20 also turns, so that both the pulsator 4 and the washing tub 3 turn together.

(Configuration of the Supporting Member 19)

Figure 5:
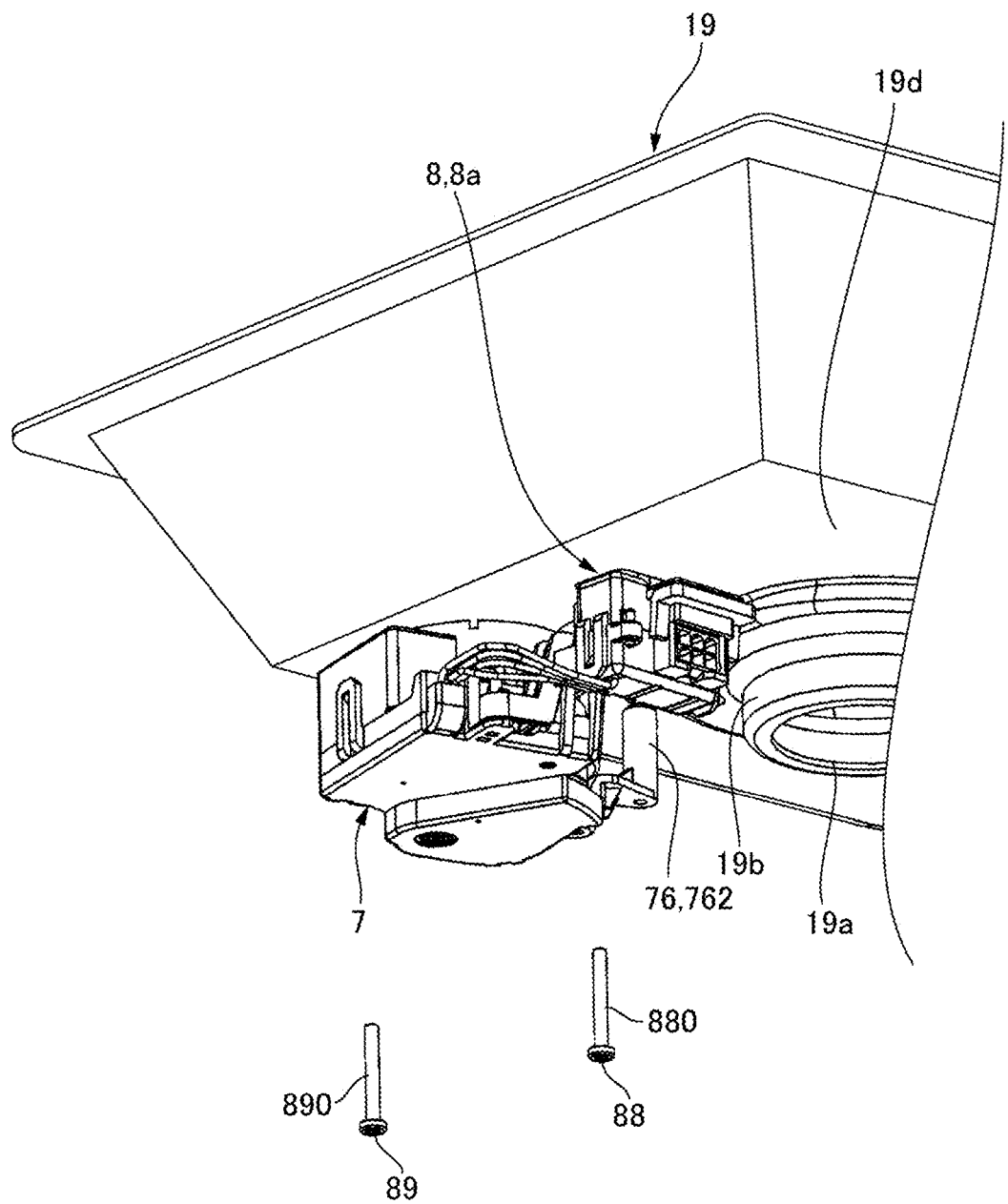
FIG. 5 is an oblique perspective illustration viewed from a lower position, in a situation where an actuator is fixed to a supporting member shown in FIG. 2A-FIG. 2B.
Figure 6:
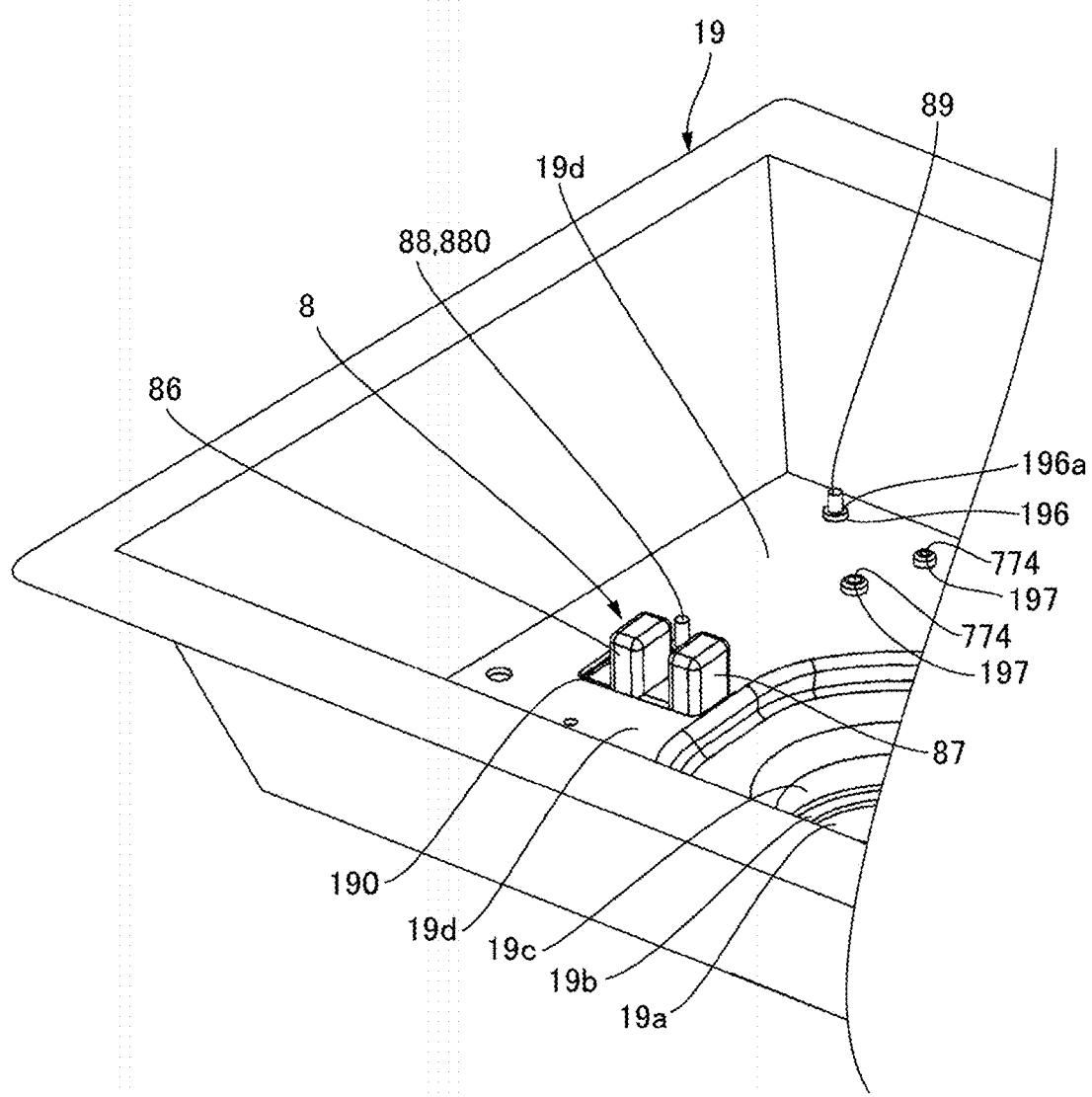
FIG. 6 is an oblique perspective illustration viewed from an upper position, in a situation where an actuator is fixed to the supporting member shown in FIG. 2A-FIG. 2B.

FIG. 5 is an oblique perspective illustration viewed from a lower position, in a situation where the actuator 7 is fixed to the supporting member 19 shown in FIG. 2A-FIG. 2B. FIG. 6 is an oblique perspective illustration viewed from an upper position, in a situation where the actuator 7 is fixed to the supporting member 19 shown in FIG. 2A-FIG. 2B.

The supporting member 19 shown in FIG. 2A-FIG. 2B, FIG. 5 and FIG. 6 is a component for supporting the clutch device 10 at a predetermined position under the washing tub 3; and the supporting member 19 is suspended from the main body frame 2, by the intermediary of a buffer material (not illustrated), together with the washing tub 3. Being located between the upper case 32 and the lower case 31, the supporting member 19 supports the clutch device 10.

The supporting member 19 has an annular protruding part 19b in which a pass-through hole 19a is located at a center position, for making the small-diameter cylindrical part 15b of the connecting member 15 pass through in the direction of the axial line 'LO.' In the supporting member 19, there is a concave part 19c, being annular, at an upper side of the annular protruding part 19b; and inside the concave part 19c, there is placed a bearing unit (not illustrated), being annular, in order to support the washing tub 3, by the intermediary of the connecting member 15 from a lower side so as to be rotatable.

As shown in FIG. 5 and FIG. 6, the actuator 7 is fixed by use of two fixing members 88 and 89 beside the annular protruding part 19b, within a lower side of a flange part 19d provided in the vicinity of the annular protruding part 19b of the supporting member 19. To the actuator 7, there is connected an auxiliary unit 8, and the auxiliary unit 8 is fixed together with the actuator 7 to the supporting member 19. In this situation, a first convex part 86 and a second convex part 87, of the auxiliary unit 8, protrude upward through an opening part 190 of the supporting member 19; and between the first convex part 86 and the second convex part 87, there is placed the third torso part 23 of the second turning member 20 shown in FIG. 3A-FIG. 3B and FIG. 4A-FIG. 4B.

(General Configuration of the Actuator 7)

Figure 8:
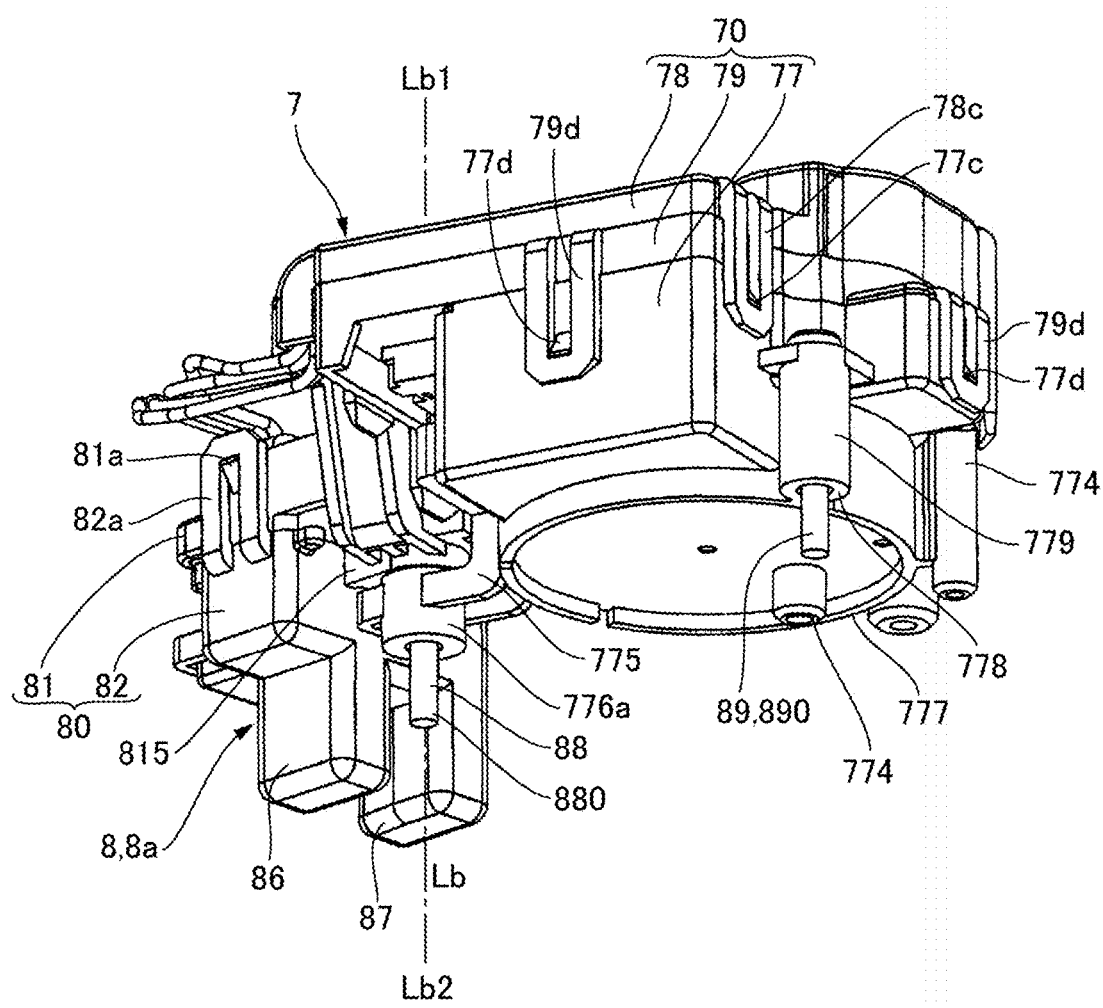
FIG. 8 is an oblique perspective illustration of the actuator, shown in FIG. 7, viewed from a side of the protruding direction of the drive pin.
Figure 9:
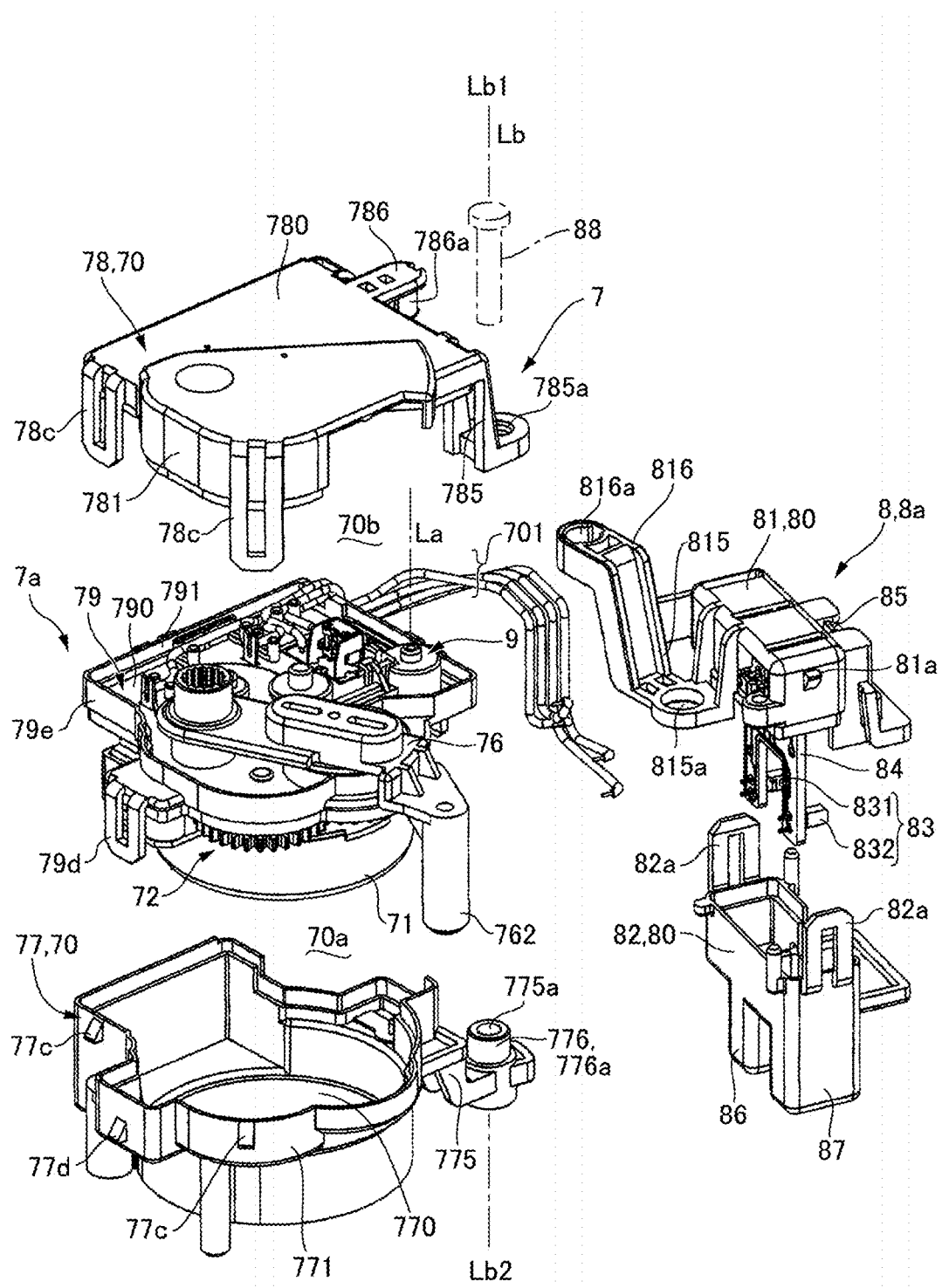
FIG. 9 is an exploded perspective view of the actuator shown in FIG. 7.

FIG. 7 is an oblique perspective illustration of the actuator 7, shown in FIG. 2A-FIG. 2B and others, viewed from a side opposite to a protruding direction of the drive pin 762. FIG. 8 is an oblique perspective illustration of the actuator 7, shown in FIG. 7, viewed from a side of the protruding direction of the drive pin 762. FIG. 9 is an exploded perspective view of the actuator 7 shown in FIG. 7. Incidentally, the actuator 7 has one of two configurations where the drive pin 762 protrudes upward in one configuration, and protrudes downward in the other configuration. In the present embodiment, the actuator 7 has a configuration where the drive pin 762 protrudes upward as shown in FIG. 3A-FIG. 3B and FIG. 4A-FIG. 4B; and meanwhile, in order to explain the configuration of the actuator 7, the actuator 7 is placed upside down in FIG. 7, FIG. 8 and FIG. 9, and the drive pin 762 is shown in a situation of protruding downward.

As shown in FIG. 7, FIG. 8 and FIG. 9, the actuator 7 includes an outer case 70, and the output element 76 whose tip end side protrudes as the drive pin 762 out of the outer case 70. The actuator 7 includes a partition component 79, being plate-like, a first case component 77 to cover one side of the partition component 79 for partitioning a first space 70a, and a second case component 78 to cover the other side of the partition component 79 for partitioning a second space 70b; and the first case component 77 and the second case component 78 make up the outer case 70. Meanwhile, between the first case component 77 and the second case component 78, there is placed a drive mechanism 7a.

The first case component 77 includes an end plate part 770 facing the partition component 79, and a side plate part 771 curved from an edge of the end plate part 770 toward the second case component 78. The second case component 78 includes an end plate part 780 facing the partition component 79, and a side plate part 781 curved from an edge of the end plate part 780 toward the first case component 77. The partition component 79 includes a bottom plate part 790, and a side plate part 791 provided at an edge part of the bottom plate part 790; and the side plate part 791 of the partition component 79 is sandwiched between the side plate part 771 of the first case component 77 and the side plate part 781 of the second case component 78, so as to make up a side surface 70s of the outer case 70, together with the side plate part 771 and the side plate part 781.

In the second case component 78, there is formed a convex engagement part 78c protruding toward the first case component 77; and meanwhile, in the side plate part 771 of the first case component 77, there is formed an engagement protrusion 77c that engages with the convex engagement part 78c. In the partition component 79, there is formed a convex engagement part 79d protruding toward the first case component 77; and meanwhile, in the side plate part 771 of the first case component 77, there is formed an engagement protrusion 77d that engages with the convex engagement part 79d. Therefore, the first case component 77, the partition component 79, and the second case component 78 can be fixed one another.

(Configuration of the Auxiliary Unit 8)

The auxiliary unit 8 is located beside the outer case 70. The auxiliary unit 8 has a cover 80 including a first cover component 81 and a second cover component 82. In the second cover component 82, there is formed a convex engagement part 82a protruding toward the first cover component 81; and meanwhile, in the first cover component 81, there is formed an engagement protrusion 81a that engages with the convex engagement part 82a. Therefore, the first cover component 81 and the second cover component 82 can be combined in a situation where the first cover component 81 and the second cover component 82 are overlapped with each other.

Inside the cover 80, a circuit board 84 is placed. To the circuit board 84, there is electrically connected a wiring assembly 701 that includes lead wire drawn out of the actuator 7. On the circuit board 84, a sensor 83 is mounted, and the auxiliary unit 8 is configured as a sensor unit 8a. A connector 85 is mounted on the circuit board 84, and the connector 85 exposes itself externally out of the first cover component 81. Accordingly, by way of the connector 85, the actuator 7 is supplied with electricity, and moreover a signal of a switching device 9 and a signal of the sensor 83 are output thereby.

The sensor 83 is a photo-interrupter including a light emitting element 831 and a light receiving element 832, being used for detecting a turn of the washing tub 3. In the second cover component 82, there are provided the first convex part 86 protruding toward a side opposite to the first cover component 81, and the second convex part 87 facing the first convex part 86; and then the light emitting element 831 and the light receiving element 832 are placed inside the first convex part 86 and the second convex part 87, respectively, in such a way as to face each other. Moreover, as already explained with reference to FIG. 5 and FIG. 6; when the auxiliary unit 8 together with the actuator 7 are fixed to the supporting member 19, the first convex part 86 and the second convex part 87 protrude upward through the opening part 190 of the supporting member 19; and between the first convex part 86 and the second convex part 87, there is placed the third torso part 23 of the second turning member 20 shown in FIG. 3A-FIG. 3B and FIG. 4A-FIG. 4B. Therefore, a turn of the washing tub 3 can be detected by way of the second turning member 20. Drive operation for the actuator 7 is carried out, being independent from a detection result with respect to the turn of the washing tub 3. Accordingly, sometimes the actuator 7 is mounted, together with the auxiliary unit 8, onto the supporting member 19; and other times the actuator 7 is independently mounted onto the supporting member 19.

(Configuration of the First Space 70a)

Figure 10:
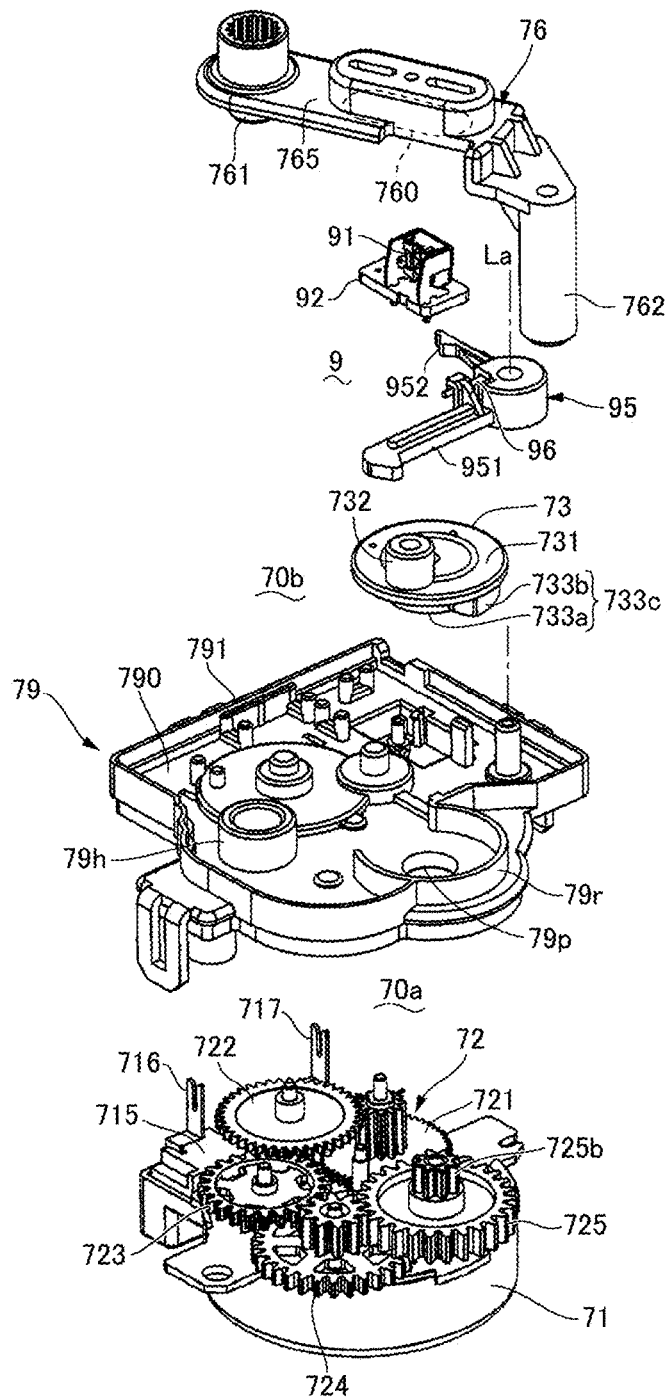
FIG. 10 is an explanatory diagram of a turn transmission mechanism and others shown in FIG. 9.

FIG. 10 is an explanatory diagram of a turn transmission mechanism 72 and others shown in FIG. 9. As shown in FIG. 9 and FIG. 10, a clutch motor 71 and the turn transmission mechanism 72 are placed in the first space 70a partitioned by use of the first case component 77 and the partition component 79. The clutch motor 71 is a synchronous electric motor, being able to turn in only one direction. The clutch motor 71 is provided with a terminal block 715 that holds terminals 716 and 717.

The turn transmission mechanism 72 includes; a first gear 721 to engage with a motor pinion (not illustrated), a second gear 722 to engage with the first gear 721, a third gear 723 to engage with the second gear 722, a fourth gear 724 to engage with the third gear 723, and a fifth gear 725 to engage with the fourth gear 724. Each of the first gear 721, the second gear 722, the third gear 723, and the fourth gear 724 is a compound gear in which a small-diameter gear and a large-diameter gear are collectively prepared. The turn transmission mechanism 72 is a speed reducing gear mechanism that reduces a turning speed of the clutch motor 71, and transmits it to the fifth gear 725. A small-diameter part 725b, being gear-shaped, of the fifth gear 725 protrudes into the second space 70b, through a hole 79p shaped inside a wall part 79r of the partition component 79.

(Configuration of the Second Space 70b)

In the second space 70b partitioned by use of the partition component 79 and the second case component 78, there are placed a root end side of the output element 76, a cam gear 73, the switching device 9 and the like. The cam gear 73 includes a disk part 731, and a torso part 733, being cylindrical, which protrudes from the disk part 731 toward the partition component 79; and at an inner circumferential surface of the torso part 733, there is formed a concave part, being gear-shaped, which engages with the small-diameter part 725b of the fifth gear 725. Therefore, a turn of the clutch motor 71 is transmitted to the cam gear 73 by way of the turn transmission mechanism 72. In the cam gear 73, the disk part 731 has an eccentric pin 732 that protrudes from the disk part 731 toward a side opposite to the partition component 79, at a position distant from a turning center axial line of the cam gear 73.

The output element 76 includes an extension part 765 whose tip end side protrudes to an outer side of the outer case 70, and the drive pin 762 that protrudes from the extension part 765, in a direction perpendicular to an extending direction of the extension part 765. A tip end side of the output element 76 protrudes to an outside of the outer case 70, through an opening part 70i (refer to FIG. 7), which is provided to the second case component 78; and the tip end side of the output element 76 is fit in the elongated hole 43 of the clutch member 40, which is already explained with reference to FIG. 3A-FIG. 3B, FIG. 4A-FIG. 4B and so on.

In the extension part 765 of the output element 76, there is shaped an elongated hole 760 in which the eccentric pin 732 of the cam gear 73 is fit. In the meantime, at the root end side of the output element 76, there is shaped a shaft part 761, and the shaft part 761 is so fit as to be rotatable, inside a cylindrical part 79h formed in the partition component 79. Therefore, if the clutch motor 71 turns so as to rotate the cam gear 73, the output element 76 oscillates by centering around the shaft part 761, so as to rotate the clutch member 40, shown in FIG. 3A-FIG. 3B and FIG. 4A-FIG. 4B, around the axial line 'LO.' Then, if the cam gear 73 further rotates, the output element 76 oscillates in an opposite direction by centering around the shaft part 761, so as to rotate the clutch member 40 in an opposite direction to allow/block mechanical engagement.

The switching device 9 includes a switch lever 95 that is so supported as to be rotatable around an axial line 'La' by a lever supporting part 798 of the partition component 79, a biasing member 96 that biases the switch lever 95 toward one direction around the axial line 'La', and a switch 91 that switches its status according to a displacement of the switch lever 95; and the switch lever 95 rotates around the axial line 'La', being linked to the output element 76. In the present embodiment, an outer circumferential surface of the torso part 733 of the cam gear 73 is a cam surface 733c where a small-diameter part 733a and a large-diameter part 733b are placed in a circumferential direction; and in the meantime, the switch lever 95 has a first lever part 951 that extends in a direction perpendicular to the axial line 'La', a tip part of the first lever part 951 contacting the cam surface 733c. In this situation, since the switch lever 95 is biased toward the one direction around the axial line 'La' by the biasing member 96, the tip part of the first lever part 951 is so biased as to contact the cam surface 733c.

The switch lever 95 has a second lever part 952 that extends in a direction perpendicular to the direction of the axial line 'La' as well as in an extending direction of the first lever part 951, and the switch 91 switches its status according to a displacement of the second lever part 952. The switch 91 is a switch of a press type, which is mounted on the circuit board 92. In the case where the tip part of the first lever part 951 contacts the small-diameter part 733a of the cam surface 733c, the tip part of the second lever part 952 is in ON status of pressing the switch 91. If the cam gear 73 rotates in ON status so that the tip part of the first lever part 951 contacts the large-diameter part 733b of the cam surface 733c, the switch lever 95 rotates toward the other direction around the axial line 'LO' in such a way that the tip part of the second lever part 952 becomes detached from the switch 91 so as to have OFF status. Therefore, it is possible to observe status of allowing/blocking the engagement between the tooth part 22a of the second turning member 20 and the tooth part 13b of the first turning member 13, shown in FIG. 3A-FIG. 3B and so on, according to an output from the switch 91.

(Connection Structure of the Actuator 7 and the Auxiliary Unit 8)

Figure 11:
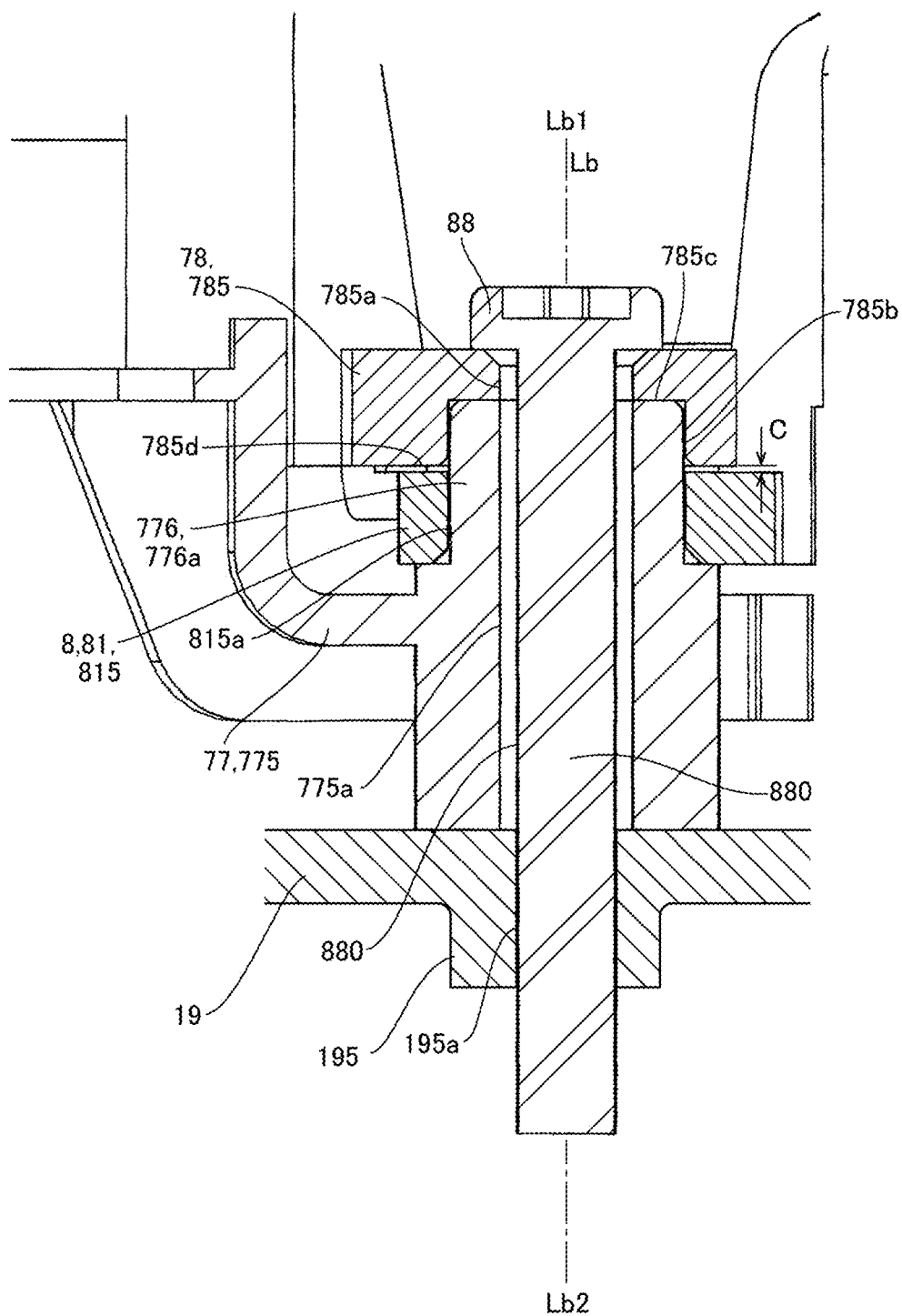
FIG. 11 is a cross sectional diagram to illustrate a fixing structure of the actuator, shown in FIG. 7, to the supporting member.

FIG. 11 is a cross sectional diagram to illustrate a fixing structure of the actuator 7, shown in FIG. 7, to the supporting member 19. As shown in FIG. 7, FIG. 8, FIG. 9 and FIG. 11, a first connection part 775 of the first case component 77, a second connection part 785 of the second case component 78, and a third connection part 815 of the auxiliary unit 8, being stacked together in a direction of an axial line 'Lb', are fixed to the supporting member 19 by use of the fixing member 88, in order to fix the actuator 7 and the auxiliary unit 8 to the supporting member 19, as illustrated in FIG. 11

More concretely to describe, in the actuator 7, the first case component 77 is provided with the first connection part 775 that protrudes toward the auxiliary unit 8; and at a tip end part of the first connection part 775, there is provided a first pass-through part 775a made of a circular pass-through hole passing through the first connection part 775 in the direction of the axial line 'Lb.' Moreover, the first case component 77 is further provided with a locating convex part 776 that protrudes from the first connection part 775 toward one side Lb1 in the direction of the axial line 'Lb.' In the present embodiment, the locating convex part 776 is materialized as a cylindrical part 776a, being cylindrical, through which the first pass-through part 775a passes through. The cylindrical part 776a also protrudes from the first connection part 775 toward the other side Lb2 in the direction of the axial line 'Lb.'

The second case component 78 is provided with the second connection part 785 that protrudes to a position where to overlap with the locating convex part 776 of the first connection part 775 at one side Lb1 in the direction of the axial line 'Lb'; and then in the second connection part 785, there is provided a second pass-through part 785a made of a circular pass-through hole that overlaps with the first pass-through part 775a. The second connection part 785 is located at a position; in such a way as to contact the locating convex part 776 from one side Lb1 in the direction of the axial line 'Lb', and to be distant in relation to the first connection part 775 at one side Lb1 in the direction of the axial line 'Lb.'

At a surface of the second connection part 785 of the other side Lb2 in the direction of the axial line 'Lb', there is shaped a concave part 785b, being circular, which is depressed toward one side Lb1 in the direction of the axial line 'Lb'; and then, the second pass-through part 785a is open toward the other side Lb2 in the direction of the axial line 'Lb', at a bottom part 785c of the concave part 785b. An inner diameter of the concave part 785b is slightly larger than an outer diameter of the locating convex part 776 of the first case component 77. Therefore, the locating convex part 776 contacts the bottom part 785c inside the concave part 785b, in order to locate the second connection part 785 in the direction of the axial line 'Lb.' In this situation, a part 785d externally surrounding the concave part 785b of the second connection part 785 and the first connection part 775 are distant from each other in the direction of the axial line 'Lb.'

The auxiliary unit 8 is provided with the third connection part 815 that protrudes toward a space between the first connection part 775 and the second connection part 785, and the third connection part 815 has a third pass-through part 815a made of a circular pass-through hole that continues in series together with the first pass-through part 775a and the second pass-through part 785a. In the present embodiment, the third connection part 815 is provided in the first cover component 81 of the cover 80 for supporting the sensor 83, in the auxiliary unit 8.

An inner diameter of the third pass-through part 815a is slightly larger than the outer diameter of the locating convex part 776 of the first case component 77. Moreover, a gap in the direction of the axial line 'Lb', between the part 785d externally surrounding the concave part 785b of the second connection part 785 and the first connection part 775, is slightly wider than a dimension, i.e., thickness, of the third connection part 815 in the direction of the axial line 'Lb.' Therefore, in a situation where the locating convex part 776 is fit inside the third pass-through part 815a, the third connection part 815 is placed between the part 785d externally surrounding the concave part 785b of the second connection part 785 and the first connection part 775.

Meanwhile, as shown in FIG. 9, the second case component 78 is provided with a protruding part 786, and the protruding part 786 has a shaft part 786a protruding toward the first case component 77. The third connection part 815 bends from a position where the third pass-through part 815a is shaped, and extends to a position that overlaps with the protruding part 786 of the second case component 78; and meanwhile, at a tip end part 816 of the third connection part 815, there is shaped a fourth pass-through hole 816a that the shaft part 786a fit in.

In order to fix the actuator 7 and the auxiliary unit 8 to the supporting member 19 as shown in FIG. 5 and FIG. 6; the third connection part 815 of the auxiliary unit 8 is placed between the first connection part 775 of the first case component 77 and the second connection part 785 of the second case component 78, as illustrated in FIG. 7 and FIG. 11; and a shaft part 880 of the fixing member 88, which passes through the second pass-through part 785a, the third pass-through part 815a, and the first pass-through part 775a from one side Lb1 in the direction of the axial line 'Lb', is fixed to a hole 195a of the supporting member 19, so as to fix the first connection part 775, the third connection part 815, and the second connection part 785 to the supporting member 19.

At the time, the shaft part 786a of the second case component 78 is fit into the fourth pass-through hole 816a of the third connection part 815. Meanwhile, a shaft part 890 of the fixing member 89 passing through a cylindrical part 779 of the first case component 77 is fixed to a hole 196a of the supporting member 19 so as to fix the first case component 77 to the supporting member 19.

As a result, under a situation where a convex part 777 being annular, a tubular part 778, and the cylindrical part 776a of the first case component 77 shown in FIG. 8 are all in a contacting state with the supporting member 19, all being as datum surfaces; the actuator 7 and the auxiliary unit 8 are fixed to the supporting member 19. Incidentally, though the first case component 77 includes a plurality of shaft parts 774 protruding further than the convex part 777, the tubular part 778, and the cylindrical part 776a, toward in the other side in the direction of the axial line 'Lb', the shaft parts 774 are fit in holes 197 shaped in the supporting member 19.

In this situation, a clearance is prepared in the direction of the axial line 'Lb', at least in one of a space between the first connection part 775 and the third connection part 815, or a space between the second connection part 785 and the third connection part 815. In this embodiment, there is prepared a clearance 'C' in the direction of the axial line 'Lb', between the second connection part 785 and the third connection part 815, as shown in FIG. 11.

In this embodiment, the hole 195a and the hole 196a of the supporting member 19 are formed by use of cylindrical parts 195 and 196, respectively, shaped by way of a burring process on the supporting member 19. Then, for example, while a female screw is manufactured in an inner circumferential surface of the cylindrical parts 195 and 196, a shaft part of the fixing members 88 and 89 is so manufactured as to have a male screw in order to fix the fixing members 88 and 89 into the hole 195a and the hole 196a by use of the screw.

(Primary advantageous effect of the present embodiment)
As explained above, according to the present embodiment; by use of the locating convex part 776 provided in the first connection part 775 of the first case component 77, the second connection part 785 of the second case component 78 can be located at a position that is distant in relation to the first connection part 775 at one side Lb1 in the direction of the axial line 'Lb.' Meanwhile, the first connection part 775 and the second connection part 785 are fixed to the supporting member 19 by use of the fixing member 88 provided with the shaft part 880 that passes through the first pass-through part 775a of the first connection part 775, and the second pass-through part 785a of the second connection part 785. Therefore, even in the case where the auxiliary unit 8 is not required, and the actuator 7 is solely fixed to the supporting member 19, the actuator 7 can be fixed by use of the fixing member 88.

In the meantime, under the situation where the first connection part 775 and the second connection part 785 are fixed to the supporting member 19 by use of the fixing member 88, the first connection part 775 and the second connection part 785 are distant from each other in the direction of the axial line 'Lb.' Accordingly, in order to fix the actuator 7 to the supporting member 19 together with the auxiliary unit 8; under a situation where the third connection part 815 of the auxiliary unit 8 is sandwiched between the first connection part 775 and the second connection part 785; the first connection part 775, the third connection part 815, and the second connection part 785, can be fixed to the supporting member 19 by way of making the shaft part 880 of the fixing member 88 pass through the first pass-through part 775a of the first connection part 775, the third pass-through part 815a of the third connection part 815, and the second pass-through part 785a of the second connection part 785. Even in this case, the fixing member 88 with the shaft part 880 having the same length can still be used. Therefore, in the case of fixing the actuator 7 to the supporting member 19 together with the auxiliary unit 8, and in the case of solely fixing the actuator 7 to the supporting member 19; the fixing member 88 with the shaft part 880 having the same length can be employed so that standardization with respect to the fixing member 88 can be materialized.

Moreover, the locating convex part 776 includes the cylindrical part 776a, and the cylindrical part 776a is placed inside the third pass-through part 815a of the third connection part 815. Therefore, in comparison to a case where the locating convex part 776 is provided at a position being distant from the first pass-through part 775a; the first connection part 775, the third connection part 815, and the second connection part 785 can more stably be fixed to the supporting member 19 by use of the fixing member 88. Moreover, a space needed for configuring the connection part can be downsized.

Other Embodiments

Though, the embodiment described above illustrates an example in which the auxiliary unit 8 exists as the sensor unit 8a, the present invention may be employed in another case where the auxiliary unit 8 is any unit other than the sensor unit 8a. Though, the embodiment described above shows a configuration in which the drive pin 762 of the output element 76 is fit in the elongated hole 43 of the clutch member 40, there may be employed a configuration in which an engagement pin provided in the clutch member 40 is fit in an elongated hole provided in the output element 76, or any other configuration. Though, in the embodiment described above, a turn of the clutch motor 71 as a turning movement of the eccentric pin 732 of the cam gear 73 is transmitted to the output element 76, the present invention may be employed in a case where a turning movement of the clutch motor 71 is once transformed to a linear motion and transmitted to the output element 76. Though, in the embodiment described above, the actuator 7 is so placed as to orient the drive pin 762 upward (toward a side of the washing tub 3), the actuator 7 may be so placed as to orient the drive pin 762 downward (toward an opposite side of the washing tub 3).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

[Reference Numerals]

1. washing machine    2. main body frame    3. washing tub
4. pulsator    5. washing machine motor
6. drive force transmission mechanism    7. actuator -continued

[Reference Numerals]

| | | |
|---|---|---|
| 7a. drive mechanism | 8. auxiliary unit | 8a. sensor unit |
| 9. switching device | 10. clutch device | 19. supporting member |
| 40. clutch member | 51. cam mechanism | 70. outer case |
| 70a. first space | 70b. second space | 71. clutch motor |
| 72. turn transmission mechanism | | 73. cam gear |
| 76. output element | 77. first case component | |
| 78. second case component | | 79. partition component |
| 80. cover | 81. first cover component | |
| 82. second cover component | | 83. sensor |
| 88. fixing member | 762. drive pin | 775. first connection part |
| 775a. first pass-through part | | 776. locating convex part |
| 776a. cylindrical part | 785. second connection part | |
| 785a. second pass-through part | | 815. third connection part |
| 815a. third pass-through part | | 880. shaft part |
| 'C'. clearance | 'Lb'. axial line | |

What is claimed is:

1. An actuator comprising:
a first case component including;
a first connection part provided with a first pass-through part, and
a locating convex part protruding from the first connection part toward one side in a direction of an axial line of the first pass-through part,
a second case component provided with;
a second connection part that is located at a position so as to contact the locating convex part from the one side in the direction of the axial line, and so as to be distant in relation to the first connection part at the one side in the direction of the axial line, and
a second pass-through part that overlaps with the first pass-through part at the second connection part in the direction of the axial line,
a drive mechanism placed between the first case component and the second case component; and
a fixing member including a shaft part that passes through the first pass-through part and the second pass-through part;
wherein, the first connection part and the second connection part are fixed to a supporting member by use of the fixing member in a situation where the locating convex part protruding from the first connection part of the first case component and the second connection part of the second case component are contacted with each other; and
wherein the first connection part and the second connection part are distant from each other with a gap in which a third connection part of an auxiliary unit is capable of being sandwiched between the first connection part and the second connection part in a situation where the first connection part and the second connection part are fixed to the supporting member by the fixing member.

2. The actuator according to claim 1;
wherein, the actuator includes the auxiliary unit provided with the third connection part sandwiched between the first connection part and the second connection part, and a third pass-through part that overlaps with the first pass-through part at the third connection part in the direction of the axial line; and
the first connection part, the third connection part, and the second connection part are fixed to the supporting member by use of the fixing member, in a situation where the shaft part passes through the first pass-through part, the third pass-through part, and the second pass-through part.

3. The actuator according to claim 2;
wherein, the auxiliary unit is a sensor unit including a cover, and a sensor supported by the cover, and the cover is provided with the third connection part.

4. The actuator according to claim 2;
wherein, the locating convex part is a cylindrical part through which the first pass-through part passes in the direction of the axial line; and
the cylindrical part is placed inside the third pass-through part.

5. The actuator according to claim 2;
wherein, a clearance is prepared in the direction of the axial line, at least in one of a space between the first connection part and the third connection part, or a space between the second connection part and the third connection part.

6. The actuator according to claim 1;
wherein, the drive mechanism includes a motor, a turn transmission mechanism, and an output element to which a turn of the motor is transmitted by the intermediary of the turn transmission mechanism.

7. A clutch device including the actuator according to claim 1;
wherein, a clutch member, which is actuated by the actuator in order to allow/block mechanical engagement, is supported by the supporting member.

8. A washing machine including the clutch device according to claim 7, the washing machine comprising;
a washing machine motor,
a washing tub,
a pulsator placed in the washing tub, and
a drive force transmission mechanism for transmitting a turning drive force of the washing machine motor to the washing tub and the pulsator;
wherein, the drive force transmission mechanism has the clutch device on the way of a drive force transmission route from the washing machine motor to the washing tub.

* * * * *